United States Patent
Klotzek (10) Patent No.: US 11,747,785 B2
(45) Date of Patent: Sep. 5, 2023

(54) POSITION-CONTROLLED CONTROL WITH COMPENSATION OF ELASTICITY-INDUCED POSITION ERRORS

(71) Applicant: Siemens Aktiengesellschaft, Munich (DE)

(72) Inventor: Andreas Klotzek, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 17/413,872

(22) PCT Filed: Sep. 20, 2019

(86) PCT No.: PCT/EP2019/075291
§ 371 (c)(1),
(2) Date: Jun. 14, 2021

(87) PCT Pub. No.: WO2020/126133
PCT Pub. Date: Jun. 25, 2020

(65) Prior Publication Data
US 2022/0043418 A1 Feb. 10, 2022

(30) Foreign Application Priority Data
Dec. 18, 2018 (EP) .................... 18213565

(51) Int. Cl.
*H02P 9/04* (2006.01)
*H02P 6/17* (2016.01)
(Continued)

(52) U.S. Cl.
CPC ............. *G05B 19/404* (2013.01); *G05D 3/20* (2013.01); *G05B 2219/41443* (2013.01)

(58) Field of Classification Search
CPC ................................ H02P 21/22; H02P 29/10
See application file for complete search history.

(56) References Cited

U.S. PATENT DOCUMENTS

| | | | | |
|---|---|---|---|---|
| 2010/0109594 A1* | 5/2010 | Miyaji | ................... | G05B 19/19 318/632 |
| 2012/0306411 A1 | 12/2012 | Tadano | | |
| 2017/0146971 A1* | 5/2017 | Ono | ..................... | G05B 13/041 |

FOREIGN PATENT DOCUMENTS

| | | |
|---|---|---|
| DE | 69700223 T2 | 12/1999 |
| EP | 0851571 A2 | 7/1998 |
| EP | 3208669 A1 | 8/2017 |

OTHER PUBLICATIONS

Yugo Tadano et al; "Periodic learning suppression control of torque ripple utilizing system identification for permanent magnet synchronous motors"; 2010 International Power Electronics Conference: IPEC-Sapporo 2010; IEEE, Piscataway, NJ, USA; pp. 1363-1370; ISBN: 978-1-4244-5394-8; XP031729726; ISBN: 978-1-4244-5394-8; pp. 1363-1370; 2010.
(Continued)

*Primary Examiner* — Eduardo Colon Santana
*Assistant Examiner* — Charles S Laughlin
(74) *Attorney, Agent, or Firm* — Henry M. Feiereisen LLC (57) ABSTRACT

Control commands for a control device of a machine define a sequence of successive sections of ideal position target values for a position-controlled shaft of the machine. The ideal position target values either increase or decrease monotonically within the sections, but the direction of the monotony changes from section to section. A position controller determines actuating signals for an actuator from position target values resulting from ideal position target values, additional target values and position actual values. Within sections, the additional target values are positive (negative) when the ideal position target values increase (decrease) monotonically. The additional target values have a first component dependent exclusively on a position difference, with the magnitude of the first component increas-
(Continued)

ing as the magnitude of the position difference increases, first strictly monotonically and then at least monotonically.

12 Claims, 4 Drawing Sheets

(51) Int. Cl.
    *G05B 19/404*     (2006.01)
    *G05D 3/20*     (2006.01)

(56)     References Cited

OTHER PUBLICATIONS

PCT International Search Report und Written Opinion of International Searching Authority dated Jan. 15, 2020 corresponding to PCT International Application No. PCT/EP2019/075291 filed Sep. 20, 2019.

* cited by examiner

POSITION-CONTROLLED CONTROL WITH COMPENSATION OF ELASTICITY-INDUCED POSITION ERRORS

CROSS-REFERENCES TO RELATED APPLICATIONS

This application is the U.S. National Stage of International Application No. PCT/EP2019/075291, filed Sep. 20, 2019, which designated the United States and has been published as International Publication No. WO 2020/126133 A1 and which claims the priority of European Patent Application, Serial No. 18213565.7, filed Dec. 18, 2018, pursuant to 35 U.S.C. 119(a)-(d).

BACKGROUND OF THE INVENTION

The present invention relates to a control method for a machine which has at least one position-controlled shaft,
wherein a sequence of control commands is specified for a control facility of the machine, said sequence defining a sequence of ideal position target values for the at least one position-controlled shaft,
wherein the sequence of ideal position target values has a number of successive sections,
wherein within a respective section of the sequence of ideal position target values, the ideal position target values either increase monotonically or decrease monotonically,
wherein from section to section of the sequence of ideal position target values, the difference between ideal position target values in immediate succession changes its sign,
wherein the control facility for the at least one position-controlled shaft implements a position controller,
wherein, corresponding to the sequence of ideal position target values, the control facility feeds the position controller a sequence of resulting position target values and a respective position actual value,
wherein the position controller determines a respective first actuating signal for an actuator of the at least one shaft on the basis of the respective resulting position target value fed to it and the respective position actual value fed to it, and thereby controls a position of the at least one shaft directly or indirectly according to the respective resulting position target value,
wherein the respective resulting position target value is obtained by adding a respective additional target value to the respective ideal position target value,
wherein within the sections of the sequence of ideal position target values, the respective additional target value is positive when the ideal position target values increase monotonically, and negative when the ideal position target values decrease monotonically.

The present invention further relates to a control program for a control facility of a machine having at least one position-controlled shaft, wherein the control program comprises machine code which can be directly processed by the control facility, wherein the processing of the machine code by the control facility causes the control facility to control the at least one position-controlled shaft according to such a control method.

The present invention further relates to a control facility of a machine having at least one position-controlled shaft, wherein the control facility is programmed with such a control program, wherein during operation, the control facility controls the at least one position-controlled shaft of the machine according to such a control method.

The present invention further relates to a machine, wherein the machine has at least one position-controlled shaft, wherein the machine has such a control facility, such that during operation, the control facility controls the at least one position-controlled shaft of the machine according to such a control method.

When regulating the position of shafts, generally speaking forces caused by friction occur. In order to cause an actual movement, frictional forces must be overcome. Furthermore, no mechanical structure—not even a shaft of a machine tool, of a robot or another production machine—has infinite rigidity. Therefore elastic deformation occurs—albeit only to a relatively slight degree.

Position sensors which detect the position of an object moved by means of the shaft (for example, a TCP=Tool Center Point), strictly speaking, do not detect the position of the object, but rather the position of the actuator, that is to say the drive of the object moved by means of the shaft. If the position sensor indicates a position which corresponds exactly to a predetermined target position, the actual position of the object moved by means of the shaft deviates from the target position by the elastic deformation. In specialist circles, this effect is commonly referred to as lost motion.

Nevertheless, in order to be able to detect the actual position of the object, in some cases a further measuring system arranged as close as possible to the moving object is used, which is, for example, the aforementioned TCP. In many cases, however, the arrangement of such a measuring system in the vicinity of the moving object is not possible or is not undertaken. In this case, the so-called lost motion must be accepted.

In the prior art, various types of compensation have already been considered. In particular, in the case of shafts which contain a gear, it is known to compensate for the gear backlash which occurs when the direction of movement changes with an additional target value which is added to the position target value (or with an inverse sign to the position actual value). In this procedure, the additional target values have a constant value within a respective section of the sequence of ideal position target values. However, these procedures often lead to more problems than they solve.

A control method for a machine which has at least one position-controlled shaft is known from EP 3 208 669 A1. The shaft is a rotary shaft, so that the position is a rotational position. A sequence of control commands are specified for the control facility of the machine, said sequence defining a sequence of ideal position target values for the at least one position-controlled shaft. The control facility implements a position controller for the at least one position-controlled shaft and feeds a sequence of resulting position target values and a respective position actual value to the position controller according to the sequence of ideal position target values. The respective resulting position target value is obtained by adding a correction value to the respective ideal position target value. The correction value is dependent both on the rotational position and on the rotational speed of the position-controlled shaft.

The object of the present invention is to create possibilities by means of which good compensation of lost motion is possible not only for shafts which contain a gear, but also for shafts in general.

SUMMARY OF THE INVENTION

The object is achieved by a control method as set forth hereinafter. Advantageous embodiments of the control method according to the invention are the object of the dependent claims.

According to the invention, a control method of the type mentioned at the beginning is configured in that, the additional target values comprise a first component which is exclusively dependent on a position difference, the position difference is either the difference between the respective ideal position target value and the first ideal position target value of the respective section or the difference between the respective ideal position target value and the respective position actual value and the absolute value of the first component of the additional target values initially increases strictly monotonically and later at least monotonically as the absolute value of the position difference increases.

By connecting the additional target values, the at least one position-controlled shaft is thus apparently moved beyond its actual target position. However, as the shaft lags, so to speak, behind the output signal of the position sensor arranged on the actuator, the exact desired position is approached if the additional target values are appropriately selected. However, abrupt target value jumps are avoided by the smooth, gradual switching of the respective additional target value to the respective ideal position target value. The resulting movement of the shaft becomes smoother and softer.

The absolute value of the first component preferably assumes a predetermined maximum value as soon as the absolute value of the position difference reaches a limit and is then kept constant within the respective section of the sequence of ideal position target values. This makes it possible, in particular, to compensate for the so-called lag error in a virtually ideal manner.

The first component preferably has the value zero at the beginning of the respective section of the sequence of ideal position target values. As a result of this procedure, in particular a continuous transition to the compensation of the lag error is achieved.

Furthermore, it is advantageous if the additional target values comprise a second component which is dependent on a travel speed of the at least one shaft. In particular, the second component can be proportional to the travel speed of the at least one shaft. This approach is based on the fact that frictional forces often have a speed-dependent component. Thus, in addition to a force-induced lost motion, a speed-induced lost motion occurs. As a result of the second component, the speed-induced component of the lost motion can be compensated in an almost ideal manner. The provision of the second component is, in principle, possible as an alternative to the provision of the first component. As a rule, however, the second component is present in addition to the first component.

As a rule, the control facility implements a speed controller which is subordinate to the position controller. In this case, the position controller does not feed the respective first actuating signal directly to the actuator. Rather, the position controller feeds the respective first actuating signal to the speed controller with a resulting speed target value and furthermore a respective speed actual value, wherein the respective resulting speed target value depends on the respective first actuating signal. In this case, the speed controller determines a respective second actuating signal for the actuator of the at least one shaft on the basis of the respective resulting speed target value and the respective speed actual value and thereby controls the speed of the at least one shaft directly or indirectly in accordance with the respective resulting speed target value.

In the simplest case, the resulting speed target value is identical to the respective first actuating signal. However, as a rule, it leads to better control behavior if the control facility determines a respective first precontrol signal on the basis of the sequence of resulting position target values without taking into account the respective position actual value and determines the respective resulting speed target value by adding the first precontrol signal to the respective ideal speed target value.

As a rule, it leads to even better control behavior if the control facility determines a respective second precontrol signal on the basis of the sequence of resulting position target values without taking into account the respective position actual value, and the speed controller does not directly feed the respective second actuating signal to the actuator, but rather the control facility determines a respective third actuating signal for the actuator by adding the respective second precontrol signal to the respective second actuating signal. In this case, the actuator is activated in accordance with the respective third actuating signal or in accordance with a respective fourth actuating signal derived from the respective third actuating signal.

It leads to particularly good results if the control facility determines a respective third precontrol signal on the basis of the sequence of additional target values without taking into account further variable parameters and determines the respective fourth actuating signal for the actuator by adding the respective third precontrol signals to the respective third actuating signal. In this case, the actuator is activated with the respective fourth actuating signal.

The addition of the respective third precontrol signal is also possible if the respective first precontrol signal is not added to the respective first actuating signal and/or the second precontrol signal is not added to the respective second actuating signal. In this case, by adding the respective third precontrol signal to the respective second actuating signal, the control facility determines a respective resulting actuating signal for the actuator with which the actuator is activated.

The object is furthermore achieved in accordance with the invention by a control program of the type mentioned at the beginning, with the control program being designed in such a way that the processing of the machine code by the control facility causes the control facility to control the at least one position-controlled shaft according to a control method according to the invention.

The object is furthermore achieved in accordance with the invention by a control facility of the type mentioned at the beginning, with the control facility being programmed with a control program according to the invention in such a way that during operation the control facility controls the at least one position-controlled shaft according to a control method according to the invention.

The object is furthermore achieved in accordance with the invention by a machine, with the control facility of the machine being designed according to the invention in such a way that during operation the control facility controls the at least one position-controlled shaft according to a control method according to the invention.

BRIEF DESCRIPTION OF THE DRAWING

The aforementioned properties, features, and advantages of this invention, as well as the manner in which they are achieved, will become clearer and more comprehensible in connection with the following description of the exemplary embodiments which are explained in more detail with reference to the diagrams. A diagrammatic view shows.

DETAILED DESCRIPTION OF PREFERRED EMBODIMENTS

Figure 1:
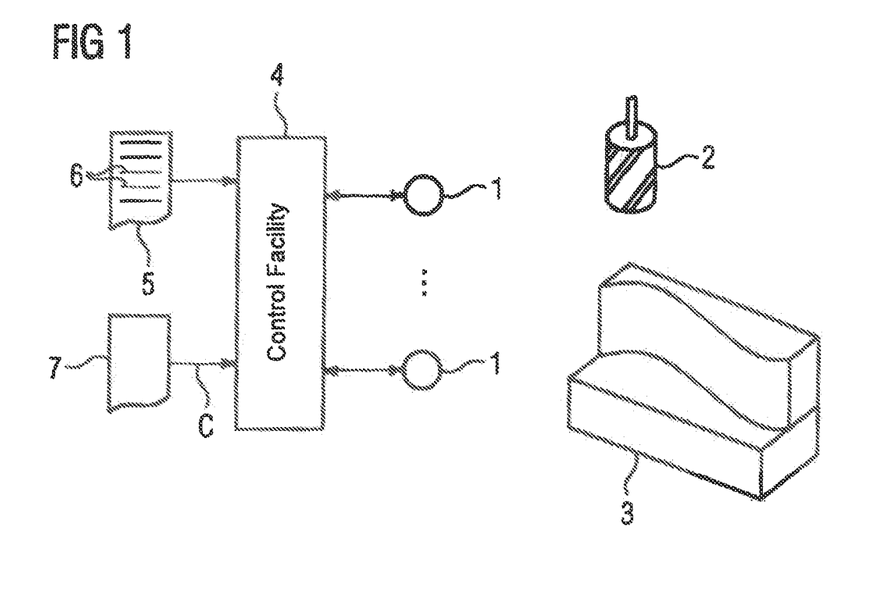
FIG. 1 a machine with a plurality of position-controlled shafts.

According to FIG. 1, a machine has a plurality of position-controlled shafts 1. The machine can be, for example, a machine tool in accordance with the illustration in FIG. 1, so that by means of the position-controlled shafts 1, a tool 2 of the machine tool is positioned translationally and/or rotationally oriented relative to a workpiece 3 to be machined. However, the machine can alternatively also be another machine, for example, an articulated arm robot or a handling machine or another production machine. What is crucial is that the machine has at least one position-controlled shaft 1.

The machine has a control facility 4 which controls the machine. The control facility 4 is a numerical control (CNC) or a motion control. The function of a motion control is very similar to that of a numerical control. The difference is essentially only in the application, namely with a numerical control for controlling a machine tool, with a motion control for controlling a robot or another machine. However, in both cases—that is to say, both in the case of a numerical control and in the case of a motion control—a position-controlled control of at least one position-controlled shaft 1, as a rule of a plurality of position-controlled shafts 1, takes place.

The control facility 4 is software programmable. The control facility 4 is therefore programmed using a control program 6. The control program 5 corresponds to a system program for the control facility 4. It comprises machine code 6. The machine code 6 can be directly processed by the control facility 4. The processing of the machine code 6 by the control facility 4 causes the control facility 4 to control at least one of the position-controlled shafts 1 according to a control method which is explained in more detail below.

For the sake of good order, it should be mentioned that, as required, the control facility 4 can also control all the position-controlled shafts 1 of the machine or at least a plurality of the position-controlled shafts 1 according to the control method explained hereinafter. It is crucial that this takes place in at least one of the position-controlled shafts 1. Hereinafter the control method is therefore also only explained for one of the position-controlled shafts 1. Hereinafter, reference is also always made only to "the position-controlled shaft 1". If the control method is implemented for a plurality or all position-controlled shafts 1, it is generally implemented in a similar manner for all such shafts 1. However, this is not imperative either. It is possible to implement various embodiments of the present invention for the individual position-controlled shafts.

A sequence of control commands C is predefined for the control facility 4. The control commands C determine a sequence of ideal position target values $x^*$ for the position-controlled shaft 1. For example, the control commands C of the control facility 4 can be predefined by means of a part program 7 which defines a coordinated sequence of respective position target values $x^*$ for a plurality of shafts 1 of the machine, so that the coordinated sequence defines a path to be travelled by the tool 2 relative to the workpiece 3 and thus for the shafts 1 in each case, a sequence of position target values $x^*$ in close succession for the respective shaft 1.

Figure 2:
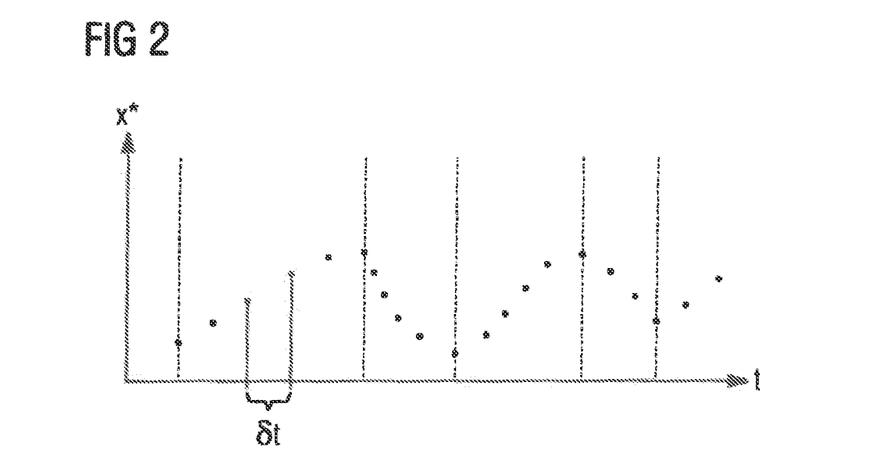
FIG. 2 a sequence of ideal position target values.

The ideal position target values $x^*$ follow one another as a function of time t at a small, generally constant time interval $\delta t$. The sequence of ideal position target values $x^*$ has, in accordance with the illustration in FIG. 2, a number of successive sections. The boundaries of the sections are indicated in FIG. 2 by dashed vertical lines. As can be seen within a respective section, the ideal position target values $x^*$ either monotonically increase or monotonically decrease, usually even either strictly monotonically increase or strictly monotonically decrease. There is therefore no reversal of the direction of the position-controlled shaft 1 within a single section. On the contrary, such a reversal of direction takes place from section to section. From section to section, the difference between ideal position target values $x^*$ in immediate succession changes its sign. Thus, purely by way of example, if each position target value $x^*$ is greater (or at least not smaller) than the immediately preceding position target value $x^*$, then in the section immediately afterwards each position target value $x^*$ is smaller (or at least not greater) than the immediately preceding position target value $x^*$. Whether the ideal position target values $x^*$—as shown in FIG. 2—are positive or negative or partially positive and partially negative, is of minor importance within the scope of the present invention, however.

Due to the processing of the machine code 6 as a rule in software the control facility 4 implements a position control. The structure and function of the position control are explained in more detail hereinafter in connection with FIG. 3 for the processing of a single ideal position target value $x^*$. However, it should be pointed out again that the procedure explained is repeated in each case with the time interval $\delta t$ with the next ideal position target value $x^*$.

Figure 3:
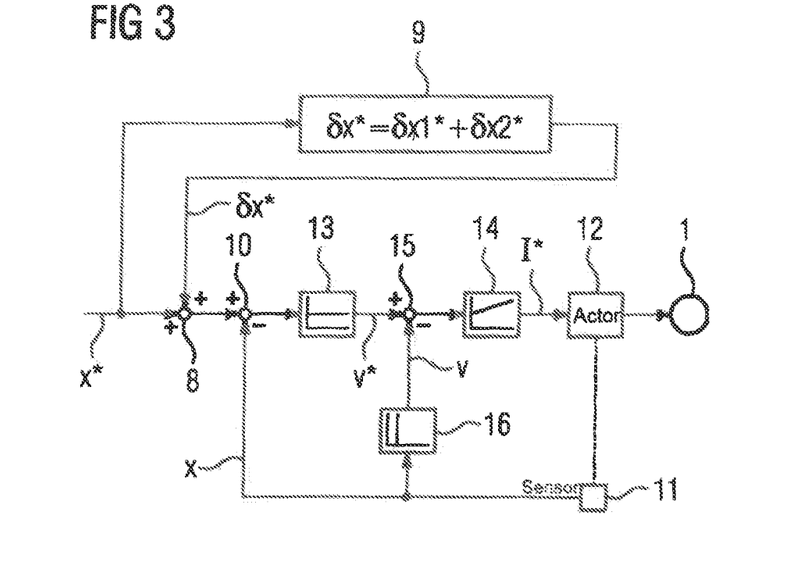
FIG. 3 a position control of an individual position-controlled shaft.

According to FIG. 3, the control facility 4 feeds the respective ideal position target value $x^*$ to a nodal point 8 and a determination block 9. The determination block 9 determines a respective additional target value $\delta x^*$, which is also supplied to the nodal point 8. The mode of operation of the determination block 9 will be explained in more detail subsequently. In the nodal point 8, the respective additional target value $\delta x^*$ is added to the respective ideal position target value $x^*$. As a result, a respective resulting position target value $x^*+\delta x^*$ is determined.

The control facility 4 feeds the respective resulting position target value $x^*+\delta x^*$ to a further nodal point 10. Furthermore, the control facility 4 feeds a respective position actual value x to the further nodal point 10. The respective position actual value x can be detected, for example, by means of a conventional position sensor 11, which detects the position of an actuator 12 by means of which the position-controlled shaft 1 is adjusted.

The difference between the respective resulting position target value $x^*+\delta x^*$ and the respective position actual value x is determined in the nodal point 10. The respective difference—usually referred to in specialist circles as control difference—is supplied to a position controller 13. The position controller 13 can, for example, be designed as a P-controller in accordance with the illustration in FIG. 3. However, it can also be designed differently, for example, as a PI-controller. On the basis of the respective control difference supplied to it, the position controller 13 determines a respective first actuating signal v* for the actuator 12. It thereby controls a position x of the position-controlled shaft 1 in accordance with the respective resulting position target value x*+δx*.

It is possible that the first actuating signal v* acts directly on the actuator 12. As a rule, however, in accordance with the illustration in FIG. 3, the control facility 4 implements a speed controller 14 which is subordinate to the position controller 13. In this case, the position controller 13 controls the position of the position-controlled shaft 1 indirectly. Furthermore, in this case, the respective first actuating signal v* is a respective ideal speed target value v*. The speed controller 14 can be designed, for example, as a P-controller or as a PI-controller. Other embodiments are also possible.

In the case of indirect control, the position controller 13 therefore does not feed the respective first actuating signal v* directly to the actuator 12. Rather, the position controller 13 initially feeds the respective first actuating signal v* to a further nodal point 15. The control facility 4 also feeds a respective speed actual value v to the further nodal point 15. The control facility 4 can determine the respective speed actual value v, for example, by differentiating the position actual value x (that is to say, determining the time derivative of the position actual value x) in a differentiator 16. However, other possibilities also exist, for example direct detection of the speed actual value v. In the further nodal point 15, the control facility 4 forms the difference between the respective ideal speed target value v* and the respective speed actual value v. The difference thus formed is supplied to the speed controller 14.

On the basis of the difference between the respective ideal speed target value v* and the respective speed actual value v, the speed controller 14 determines a respective second actuating signal I* for the actuator 12. The speed controller 14 thus regulates the speed v of the shaft 1 in accordance with the respective speed target value v*.

Analogously to the mode of operation of the position controller 13, the speed controller 14 can act directly or indirectly on the actuator 12. For example, in accordance with the illustration in FIG. 3, it is possible that the actuator 12 is activated directly using the respective second actuating signal I*, for example, in the case of an electric machine, a converter is activated. In the case of an indirect effect, for example, it is possible that a further controller is subordinate to the speed controller 14, in particular, a current controller. However, this is not shown in FIG. 3.

Figure 4:
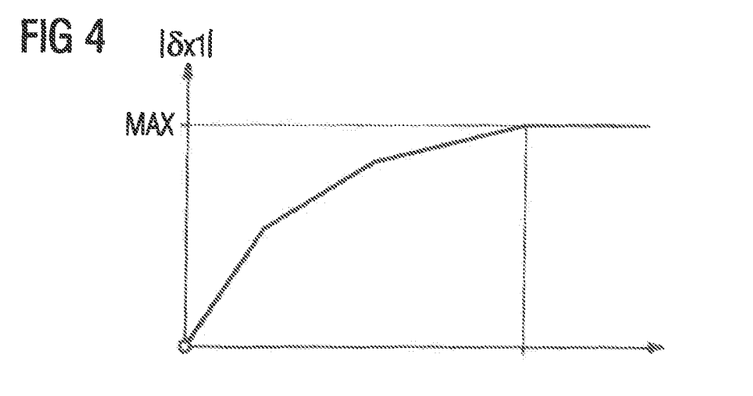
FIG. 4 a functional course of a first component of an additional target value.

In accordance with the illustration in FIG. 3, the respective additional target value δx* comprises, in particular, at least one first component δx1*. The first component δx1* depends exclusively on a position difference. The position difference is the difference between the respective ideal position target value x* and the first ideal position target value x* of the respective section of the sequence of ideal position target values x*. FIG. 4 shows this dependence. The absolute value of the position difference is plotted on the abscissa, that is to say, the distance traveled from the start of the method in the current direction of travel or—equivalent hereto—from the start of the last reversal of direction that has already taken place. The associated absolute values of the first additional target values δx1* are plotted on the ordinate. In accordance with the illustration in FIG. 4, the absolute value of the first component δx1* increases monotonically as the absolute value of the position difference increases, in a first region, that is to say, until the absolute value of the position difference reaches a predetermined upper limit, the absolute value of the first component δx1* increases strictly monotonically as the absolute value of the position difference increases. The upper limit itself has a value greater than 0.

As a rule, the absolute value of the first component δx1* from the lower upper limit is constant. Alternatively, the absolute value of the first component δx1* from the lower upper limit up to a higher upper limit may increase monotonically. In this case, the absolute value of the first component δx1* is constant from reaching the higher upper limit.

Figure 5:
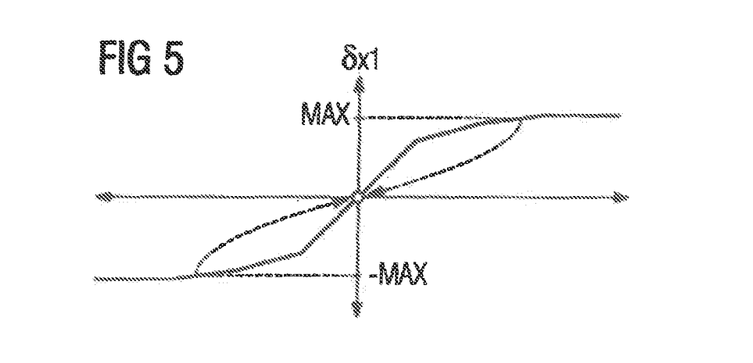
FIG. 5 the functional course of FIG. 4 for positive and negative position differences, FIG. 6 a functional course of a second component of the additional target value, and FIGS. 7 to 9 modifications of the position control of FIG. 3.

Within the sections of the sequence of ideal position target values x*, the first components δx1* uniformly have the same sign. In particular, in accordance with the illustration in FIG. 5, the first component δx1* is always positive if the ideal position target values x* increase monotonically. Conversely, in accordance with the illustration in FIG. 5, the respective additional target value δx* is always negative if the ideal position target values x* decrease monotonically. During the transition from one section of the sequence of ideal position target values x* to the next section of the sequence of ideal position target values x*, the first component δx1* thus changes its sign. In particular, in accordance with the illustration in FIG. 5, at the end of a respective section of the sequence of ideal position target values x*, there is a jump to the first component δx1*, which is assumed at the start of the next section. This is indicated in FIG. 5 by the two curved arrows drawn in dashed lines.

It is possible that the absolute value of the first component δx1* already has a certain absolute value other than zero at the start of a respective section of the sequence of ideal position target values x*. However, the first component δx1* preferably has the value zero at the start of a respective section of the sequence of ideal position target values x* in accordance with the illustration in FIGS. 4 and 5. Furthermore, as shown in FIGS. 4 and 5, the absolute value of the first component δx1* assumes a predetermined maximum value MAX as soon as the absolute value of the position difference reaches a predetermined limit. Thereafter, the first component δx1* within the respective section of the sequence of ideal position target values is no longer increased, but rather kept constant. Depending on the embodiment, the aforementioned predetermined limit corresponds either to the lower upper limit or to the higher upper limit.

Below the aforementioned limit, various approaches are possible. For example, a linear, a section-wise linear or a continuously attenuating increase to the maximum value MAX can take place. The manner in which the respective first component δx1* is determined is also secondary in nature. For example, the functional course can be defined by a table or by functions. The table can be filled with values or the functions can be parameterized, for example, on the basis of test drives. The input variable in the table or in the functions is the ideal travel path programmed since the last reversal of direction. The output variable is the respective first component δx1*.

Figure 6:
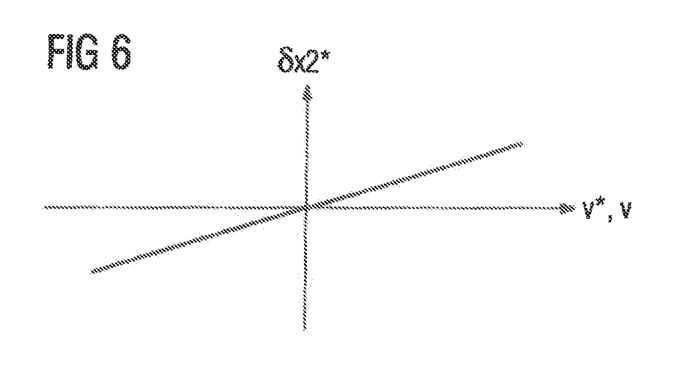

It is possible that the additional target values δx* exclusively comprise the first component δx1*. In this case, it is immediately and readily apparent that with the first components δx1* within the sections of the sequence of ideal position target values x*, the respective additional target value δx* is also positive if the ideal position target values x* increase monotonically, and vice versa, is negative if the ideal position target values x* decrease monotonically. However, the additional target values δx* preferably comprise a second component δx2* in addition to the first component δx1*, in exceptional cases as an alternative, as a rule and in accordance with the illustration in FIG. 3. The second component δx2* is dependent on a travel speed of the at least one shaft 1. In particular, the second component δx2* can be proportional to the travel speed of the at least one shaft 1, as shown in FIG. 6. Here too, however, in accordance with the illustration in FIG. 6, analogous to the first component δx1*, the second component δx2* is always positive when the ideal position target values x* increase monotonically, and conversely, is always negative when the ideal position target values x* decrease monotonically. Depending on whether it is derived from the ideal position target values x* or from the position actual values x or is recorded directly, the travel speed can alternatively be a target speed or an actual speed.

The embodiments according to the invention can be modified in various ways. Hereinafter two embodiments are first explained, which are preferably implemented together in accordance with the illustration in FIG. 7. In principle, however, they can also be implemented independently of one another. Then, in conjunction with FIG. 8, a further embodiment is explained which builds on the embodiment according to FIG. 7. However, the additional embodiment according to FIG. 8 can also be realized separately from the advantageous embodiments according to FIG. 7.

Figure 7:
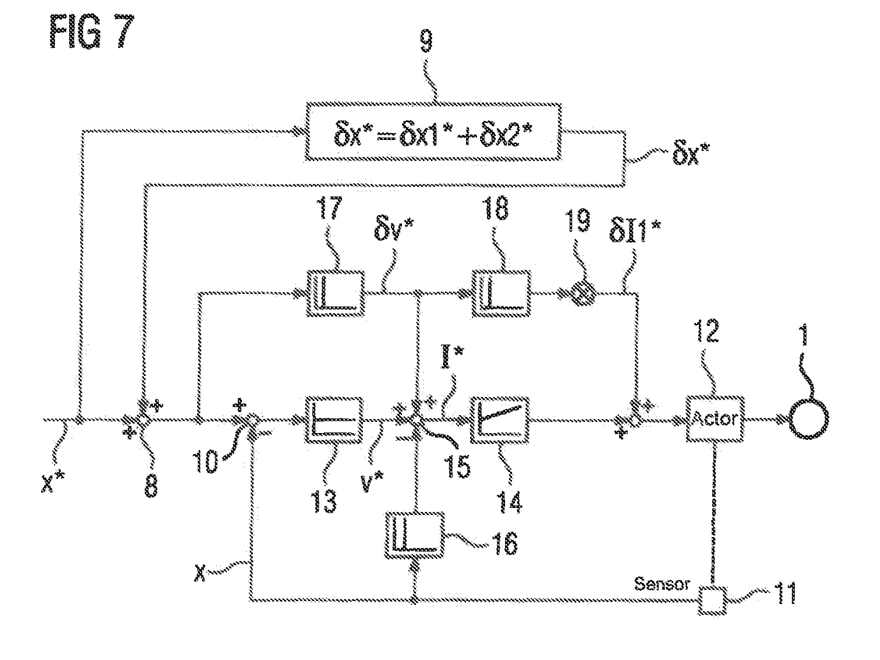

According to the illustration in FIG. 7, the control facility 4 determines a respective first precontrol signal δv* in a further determination block 17 on the basis of the sequence of resulting position target values x*+δx*. In the further determination block 17, the control facility 4 can, for example, differentiate the resulting position target values x*+δx*, that is to say, determine their time derivative. In any case, the first precontrol signals δv* are determined without taking into account the respective position actual value x.

If the control facility 4 determines the first precontrol signals δv*, the control facility 4 determines a respective resulting speed target value v*+δv* by adding the respective first precontrol signal δv* to the respective ideal speed target value v*. In this case, the speed controller 14 is used to adjust the speed to the resulting speed target value v*+δv*. The respective resulting speed target value v*+δv* is therefore no longer identical to the respective ideal speed target value v*, but still depends on the respective ideal speed target value v*. In particular, the difference is only the corresponding respective precontrol signal δv*.

Furthermore, according to the illustration in FIG. 7, the control facility 4 determines a respective second precontrol signal δI1* on the basis of the sequence of resulting position target values x*+δx*. The control facility 4 can determine a further differentiation of the already determined respective first precontrol signal δv*, for example in a further determination block 18, and then by scaling the intermediate signal thus determined in a multiplier 19, the respective second precontrol signal δI1*. However, a direct determination of the respective second precontrol signal δI1* is also possible without previous determination of the respective first precontrol signal δv*. In any case, the second precontrol signals δI1* are also determined without taking into account the respective position actual value x.

If the control facility 4 determines the second precontrol signals δI1*, the control facility 4 determines a respective third actuating signal I*+δI1* by adding the respective second precontrol signal δI1* to the respective second actuating signal I*. In this case, the speed controller 14 does not feed the respective second actuating signal I* directly to the actuator 12. Rather, the respective third actuating signal I*+δI1* is determined beforehand. In this case, the actuator 12 is activated in accordance with the illustration in FIG. 7 in accordance with the respective third actuating signal I*+δI1*.

Figure 8:
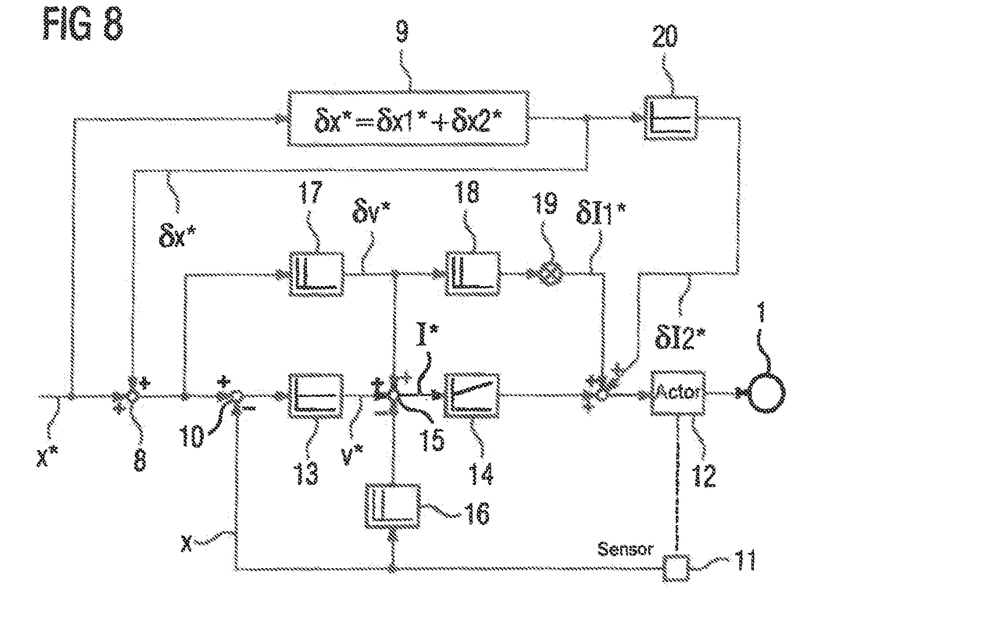

In accordance with the embodiment according to FIG. 8, the control facility 4 furthermore determines, in a further determination block 20, a respective third precontrol signal δI2* on the basis of the sequence of additional target values δx*. This determination takes place without taking into account further variable parameters. The respective third precontrol signal δI2* is added by the control facility 4—in accordance with the illustration in FIG. 8, in addition to the respective second precontrol signal δI1*, but in principle independently thereof to the respective second actuating signal I*. As a result, the control facility 4 in the embodiment according to FIG. 8 determines the respective final actuating signal with which the actuator 12 is activated.

Figure 9:
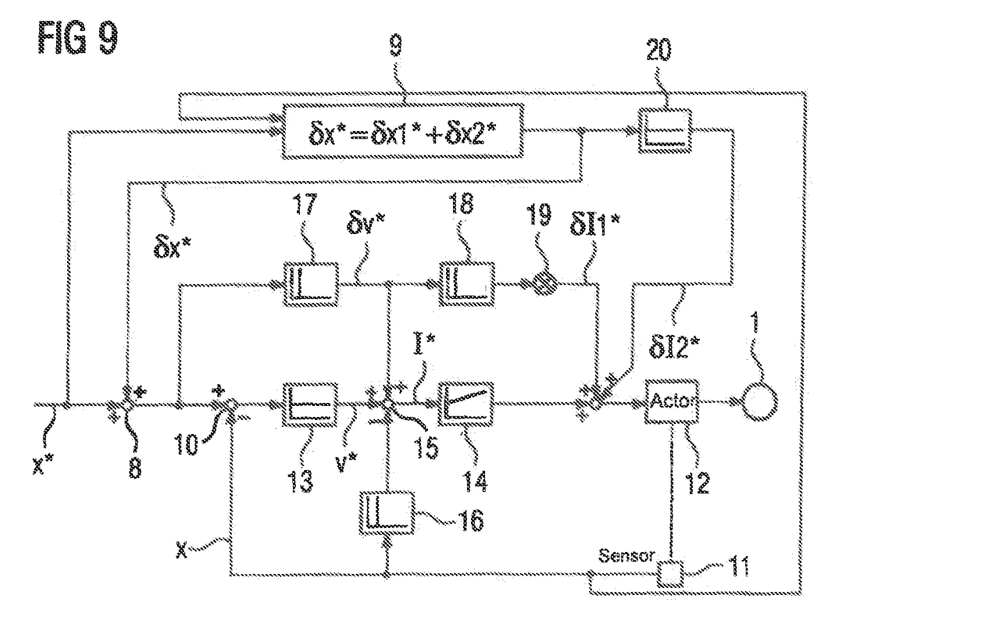

As far as explained so far, the position difference, on the basis of which the respective first component δx1* of the respective additional target value δx* is determined, corresponds to the difference between the respective ideal position target value x* and the first ideal position target value x* of the respective section. However, it is alternatively possible that the position difference corresponds to the difference between the respective ideal position target value x* and the respective position actual value x. In this case, only the position actual value x must also be supplied to the determination block 9 in addition to the respective ideal position target value x*. The remaining determinations can be maintained unchanged. FIG. 9 shows this in a corresponding modification of the embodiment according to FIG. 8. However, the corresponding modification is also possible in the embodiments of FIGS. 3, 6 and 7.

In summary, the present invention thus relates to the following facts:

Control commands C are specified for a control facility 4 of a machine, said control commands defining a sequence of ideal position target values x* for a position-controlled shaft 1 of the machine. This sequence has successive sections. Within the sections, the ideal position target values x* either increase monotonically or decrease monotonically. The direction of the monotony changes from section to section. The control facility 4 implements a position controller 13 and, corresponding to the sequence, feeds position target values x*+δx* resulting from ideal position target values x* and position actual values x to the position controller 13. From said values, the position controller 13 determines actuating signals v* for an actuator 12 of the shaft 1 and thereby controls a position x of the shaft 1 correspondingly. The resulting position target values x*+δx* correspond to the sums of the ideal position target values x* and the additional target values δx*. Within the sections, the additional target values of are positive when the ideal position target values x* increase monotonically. If the ideal position target values x* decrease monotonically, the additional target values δx* are negative. The additional target values δx* comprise a first component δx1* which is dependent exclusively on a position difference. The position difference is either the difference between the respective ideal position target value x* and the first ideal position target x of the respective section or the difference between the respective ideal position target value x* and the respective position actual value x. The absolute value of the first component δx1* of the additional target values δx* increases as the absolute value of the position difference increases, initially strictly monotonically and then at least monotonically.

The present invention has many advantages. In particular, both deformation-induced lag errors and the speed-induced lag error can be compensated in an efficient manner. Furthermore, a further measuring system arranged at a distance from the actuator 12 for detecting the (actual) position of the at least one position-controlled shaft 1 is not required.

Although the invention has been illustrated and described in detail by the preferred exemplary embodiment, the invention is not limited by the disclosed examples, and other variations can be derived therefrom by a person skilled in the art without departing from the scope of the invention.

What is claimed is:

1. A method for controlling a machine having at least one position-controlled shaft, the method comprising:
    specifying for a control facility of the machine a sequence of control commands which define for the at least one position-controlled shaft a sequence of ideal position target values composed of a plurality of successive sections, with the ideal position target values within a section of the sequence of ideal position target values either increasing monotonically or decreasing monotonically and with a difference between immediately successive ideal position target values changing its sign from one of the plurality of successive sections to a following one of the plurality of the successive sections,
    receiving from the control facility at a position controller for the at least one position-controlled shaft a sequence of resulting position target values and a corresponding position actual value commensurate with the sequence of ideal position target values, wherein the resulting position target values are obtained by adding to the ideal position target values respective additional target values, with a respective additional target value being positive when the ideal position target values increase monotonically within a section, and the respective additional target value being negative when the ideal position target values decrease monotonically within the section, with the additional target values comprising a first component which is dependent exclusively on a position difference which is either a difference between the respective ideal position target value and the first ideal position target value of the respective section, or a difference between the respective ideal position target value and the respective position actual value, with a magnitude of the first component of the additional target values increasing as a magnitude of the position difference increases, initially strictly monotonically and then at least monotonically,
    determining with the position controller, based on the received sequence of resulting position target values and the corresponding position actual value, a first actuating signal for an actuator of the at least one shaft, and
    controlling a position of the at least one shaft, directly or indirectly, commensurate with the resulting position target value for the at least one shaft.

2. The method of claim 1, wherein the magnitude of the first component assumes a predetermined maximum value when the magnitude of the position difference reaches a limit and is then kept constant within the respective section of the sequence of ideal position target values.

3. The method of claim 1, wherein the first component has a value of zero at a beginning of the respective section of the sequence of ideal position target values.

4. The method of claim 1, wherein the additional target values comprise a second component which is dependent on a travel speed of the at least one shaft, in particular proportional to the travel speed of the at least one shaft.

5. The method of claim 1, further comprising:
    feeding with the position controller the respective first actuating signal and a respective speed actual value to the actuator of the at least one shaft not directly, but via a speed controller which is subordinate to the position controller, with a respective resulting speed target value depending on the respective first actuating signal, and
    determining with the speed controller a respective second actuating signal for the actuator based on the respective resulting speed target value and the respective speed actual value, and
    controlling directly or indirectly a speed of the at least one shaft commensurate with the respective resulting speed target value.

6. The method of claim 5, further comprising:
    determining with the control facility a respective first precontrol signal based on the sequence of resulting position target values, without taking into account the respective position actual value, and
    determining with the control facility the respective resulting speed target value by adding the respective first precontrol signal to a respective ideal speed target value.

7. The method of claim 6, further comprising:
    determining with the control facility a respective second precontrol signal based on the sequence of resulting position target values, without taking into account the respective position actual value, and
    feeding the respective second actuating signal not directly from the speed controller to the actuator, but instead determining a respective third actuating signal for the actuator by adding the respective second precontrol signal to the respective second actuating signal, and
    controlling the actuator either commensurate with the respective third actuating signal or commensurate with a respective fourth actuating signal derived from the respective third actuating signal.

8. The control method of claim 7, further comprising:
    determining with the control facility a respective third precontrol signal based on the sequence of resulting position target values, without taking into account the respective position actual value, and
    determining with the control facility the respective fourth actuating signal for the actuator by adding the respective third precontrol signal to the respective third actuating signal, and
    controlling the actuator with the respective fourth actuating signal.

9. The method of claim 5, further comprising:
    determining with the control facility a respective third precontrol signal based on the sequence of resulting position target values, without taking into account the respective position actual value,
    determining with the control facility a respective resulting actuating signal for the actuator by adding the respective third precontrol signal to the respective second actuating signal, and
    controlling the actuator with the respective resulting actuating signal.

10. A control program for a control facility of a machine having at least one position-controlled shaft, wherein the control program is stored on a computer-readable non-transitory storage medium and comprises machine code which when loaded into a memory of by the control facility and executed by a processor of the control facility, causes the control facility to control the at least one position-controlled shaft according to the method of claim 1.

11. A control facility of a machine which has at least one position-controlled shaft, wherein the control facility is configured to control, during operation, the at least one position-controlled shaft of the machine according to the method of claim 1.

12. A machine, comprising:
   at least one position-controlled shaft, and
   a control facility, wherein, during operation, the control facility is configured to control the at least one position-controlled shaft of the machine according to the method of claim 1.

* * * * *